(12) United States Patent
Killingbeck

(10) Patent No.: US 10,683,800 B2
(45) Date of Patent: Jun. 16, 2020

(54) ENGINE

(71) Applicant: Tree Associates Ltd., Fakenham, Norfolk (GB)

(72) Inventor: Bernard Killingbeck, Fakenham (GB)

(73) Assignee: Tree Associates Ltd., Fakenham, Norfolk (GB)

( * ) Notice: Subject to any disclaimer, the term of this patent is extended or adjusted under 35 U.S.C. 154(b) by 121 days.

(21) Appl. No.: 15/750,029

(22) PCT Filed: Aug. 5, 2016

(86) PCT No.: PCT/GB2016/052399
§ 371 (c)(1),
(2) Date: Feb. 2, 2018

(87) PCT Pub. No.: WO2017/021736
PCT Pub. Date: Feb. 9, 2017

(65) Prior Publication Data
US 2018/0223731 A1 Aug. 9, 2018

(30) Foreign Application Priority Data

Aug. 6, 2015 (GB) .................................. 1513936.3

(51) Int. Cl.
F02C 1/10 (2006.01)
F01D 15/10 (2006.01)
(Continued)

(52) U.S. Cl.
CPC ................ F02C 1/10 (2013.01); F01D 15/10 (2013.01); F01D 25/12 (2013.01); F02C 7/141 (2013.01);
(Continued)

(58) Field of Classification Search
CPC .. F01D 15/10; F01D 25/12; F02C 1/10; F02C 7/141; F05D 2210/12; F05D 2220/76; F05D 2260/20; F02G 2250/03
See application file for complete search history.

(56) References Cited

U.S. PATENT DOCUMENTS 4,558,228 A * 12/1985 Larjola .................. F01D 15/10
290/2
5,392,606 A * 2/1995 Labinov ................. F01K 25/00
60/653

(Continued)

FOREIGN PATENT DOCUMENTS

DE    10 2012 200892 A1    7/2013
JP    H11 270346 A         10/1999

OTHER PUBLICATIONS

DE102012200892 Translation, Danov, 2013.*
(Continued)

Primary Examiner — Jesse S Bogue
(74) Attorney, Agent, or Firm — Erise IP, P.A.

(57) ABSTRACT

An engine comprises a compressor and a closed fluid circuit connected to the input and output of the compressor such that compressed gas can be driven through the circuit by the compressor. The output of the compressor is connected, through the fluid circuit, to a turbine component comprising at least one set of turbine blades connected to a rotating shaft that acts as the output of the engine in use. A condenser receives fluid in the circuit that has passed through the turbine component and is arranged to reduce the temperature and pressure of the compressed gas, the outlet of the condenser being connected to the inlet of the compressor.

20 Claims, 2 Drawing Sheets

(51) Int. Cl.
   *F01D 25/12*  (2006.01)
   *F02C 7/141*  (2006.01)
(52) U.S. Cl.
   CPC ...... *F05D 2210/12* (2013.01); *F05D 2220/76* (2013.01); *F05D 2260/20* (2013.01)

(56) References Cited

U.S. PATENT DOCUMENTS

| | | | | |
|---|---|---|---|---|
| 6,606,860 B2* | 8/2003 | McFarland | ............. | F01K 25/10 60/648 |
| 6,827,104 B2* | 12/2004 | McFarland | ............. | F01K 25/10 137/624.13 |
| 7,418,824 B2* | 9/2008 | Uno | ............. | F01C 11/004 62/238.6 |
| 7,669,430 B2* | 3/2010 | Matsui | ............. | F01D 15/10 62/158 |
| 8,661,780 B2* | 3/2014 | Wettstein | ............. | F02C 1/08 60/39.511 |
| 8,826,639 B2* | 9/2014 | Simpkin | ............. | F02C 1/06 165/104.13 |
| 9,118,226 B2* | 8/2015 | Kacludis | ............. | F02C 1/04 |
| 9,976,448 B2* | 5/2018 | Peter | ............. | F02C 1/05 |
| 2003/0074900 A1* | 4/2003 | McFarland | ............. | F02C 1/10 60/670 |
| 2007/0101735 A1* | 5/2007 | Matsui | ............. | H02P 9/48 62/160 |
| 2008/0264062 A1* | 10/2008 | Prueitt | ............. | F01K 27/00 60/670 |
| 2012/0227425 A1* | 9/2012 | Poerio | ............. | F25B 27/005 62/115 |
| 2013/0247558 A1* | 9/2013 | Maruya | ............. | B01D 3/007 60/597 |
| 2018/0371933 A1* | 12/2018 | Tsourapas | ............. | F01D 15/10 |

OTHER PUBLICATIONS

International Search Report dated Oct. 25, 2016 in International Application No. PCT/GB2016/052399; Filed: Aug. 5, 2016; Applicant: Tree Associates Ltd.

Written Opinion of the International Searching Authority dated Oct. 25, 2016 in International Application No. PCT/GB2016/052399; Filed: Aug. 5, 2016; Applicant: Tree Associates Ltd.

* cited by examiner

ENGINE

RELATED APPLICATIONS

The present application is a national stage application under 35 U.S.C. § 371 of International Application No. PCT/GB2016/052399, filed 5 Aug. 2016, which claims priority to Great Britain Patent Application No. 1513936.3, filed 6 Aug. 2015. The above referenced applications are hereby incorporated by reference into the present application in their entirety.

The present invention relates to an engine which employs circulating compressed gas to drive a turbine to provide energy output.

A wide variety of engines are well known, from conventional internal combustion engines, through to engines driven by compressed air, wind, water power and other sources.

All such engines are driven by the need to provide energy output whilst minimising energy consumption and also minimise emissions that may be harmful to the environment. Furthermore, they often have the need to have simple control of their output, as well as the desire to have a long useable life through the use of a minimal amount of moving components and the provision of components with minimal wear and tear to reduce maintenance requirements.

The present invention seeks to provide an engine which is highly efficient, which is highly controllable in terms of its output, and yet which is simple and easy to maintain and has a long useable lifetime with minimal maintenance.

According to the present invention there is provided an engine comprising a compressor and a closed fluid circuit connected to the input and output of the compressor such that compressed gas can be driven through the circuit by the compressor, the output of the compressor being connected, through the fluid circuit to a turbine component comprising at least one set of turbine blades connected to a rotating shaft that acts as the output of the engine in use; a condenser for receiving fluid in the circuit that has passed through the turbine component and arranged to reduce the temperature and pressure of the compressed gas, the outlet of the condenser being connected to the inlet of the compressor.

The turbine may comprise plural sets of blades arranged along a common axis, the number of blades in each set, and their relative positions being configured to control flow of the compressed gas through the turbine component and control the output power of the engine.

A check valve may be located at the input to compressor to control flow of expanded circulating gas to the input of the compressor to improve its efficiency and optimise performance of the engine for a given load.

The circulating gas in the engine may be ammonia, of more preferably, for safety and operational efficiency reasons, may be carbon dioxide.

The condenser component may be attached to energy recovery means for recovering heat energy that can be converted into electrical energy to drive the compressor and improve the efficiency of the engine.

The turbine shaft may be connected to a generator which provides a proportion of the energy required to generate the compressor in order to control the overall performance of the engine.

One example of the present invention will now be described with reference to the accompanying drawings, in which.

Figure 1:
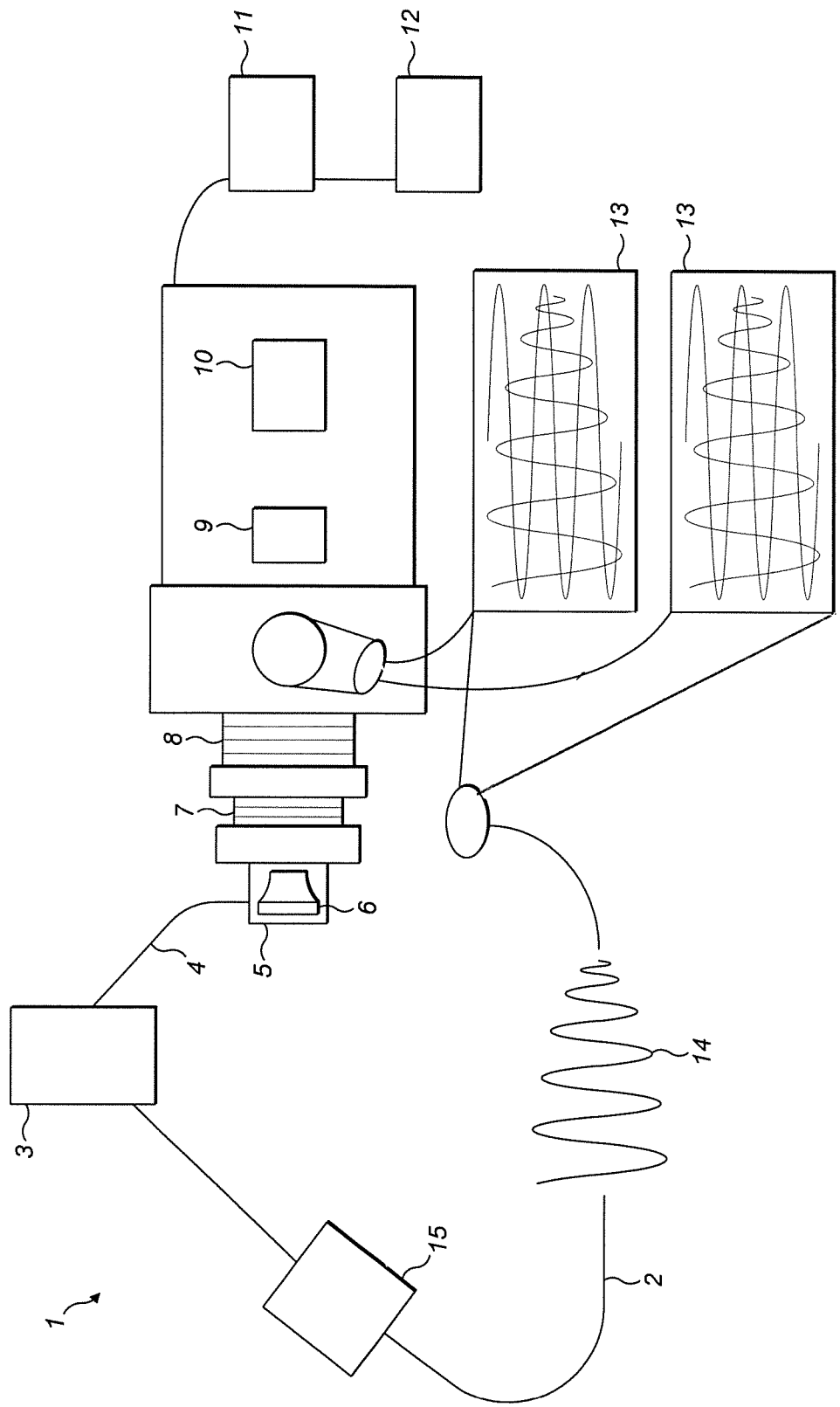
FIG. 1 is a schematic view of an engine according to the present invention.

Referring to FIG. 1, an engine 1 has a gas circuit 2 to hold compressed gas. The gas may be carbon dioxide, ammonia or any other appropriate gas that can be held at the appropriate compression pressure, dependent upon the output required in the engine, as well as other requirements such as overall weight, preferred operating pressure, and the temperature thresholds of the components forming the circuit and other parts of the engine.

A compressor 3 is provided which, in use, compresses gas in the circuit and drives it from a compressor outlet 4 towards a turbine component 5. The compressor in this example is electrically powered but may have an alternative power source. The diameter of the compressor outlet 4 controls the pressure and flow rate of the compressed gas as it arrives at the turbine 5. High efficiency is provided if the pressure and temperature of the gas is at its critical point in this section of the fluid circuit. A heater (not shown) can be incorporated adjacent to the compressor 3 to heat the compressed gas to aid in achieving this. As gas passes from the compressor outlet 4 into the turbine component 5 it passes over sets of blades 6, 7 and 8, expanding as it does so and driving the series of blades and a central shaft 9 to which the sets of blades 6, 7, 8 are attached. In this example three sets of blades 6, 7, 8 have been provided, although the number of sets, together with the number of blades in each set, and their angle of configuration, can be selected dependent upon the pressure at which the gas resides in the turbine component 5, as well as flow rate. The shaft 9 acts as an output, and can be connected through a gear box to a mechanical component to be driven.

In this example it is shown connected to an electrical generator 10 which is linked to control components 11 and 12. These control components can receive electrical power from the generator 10 to control the output load on the shaft 9, the operating output of the generator 10, and also potentially to control feedback of electricity generated from the generator 10 to the compressor 3, again to control overall operating output of the engine to optimise its energy efficiency. It may be that in addition, or as an alternative, the generator 10 is mechanically connected to the compressor 3 so that it can be operated as a motor to start the compressor 3. It may also be that components from the generator 10 and turbine components are integrated into a single unit to reduce size and mechanical losses associated with connection of the two.

In one example the generator generates AC at 400 Hz, to provide high efficiency, yet also has stepping components to drop it to 50 Hz for use with standard electrical components.

After passing over the turbine blade sets 6, 7, 8, the gas, now at a very much lower pressure, passes out of the turbine component 5 through a condenser 13. In this example the condenser is a series of pipes and dissipates residual heat in the gas that it is left following its expansion. In one example, the condenser 13 can act as a heat exchanger so that the heat energy there can be recovered and potentially converted into other forms of energy, potentially even electrical energy, to improve the efficiency of the electrical output of the engine or indeed to provide supply to control components or to the compressor 3. The output of the condenser 13 is then fed through a further pressure reducing component 14, which is optional, and through a check valve 15, which is also optional, and back to be compressed once more by the compressor 3. The check valve 15 ensures gas flow in a single direction and can help ensure correct flow of gas through the system, particularly during start-up, and can be used to regulate the output of the engine through flow of the gas, therefore optimising efficiency of the engine.

The check valve 15 can also be used to regulate the pressure differential across the compressor 3 to optimise its operational efficiency.

A relief valve (not shown) may be placed at an appropriate point in the fluid circuit to release unwanted pressure build up if necessary for safety reasons.

In one example of operation the pressure differential across the compressor 3 is controlled at around 22 bar with $CO_2$ as the driven gas (30 bar at compressor input and 52 at output).

Figure 2:
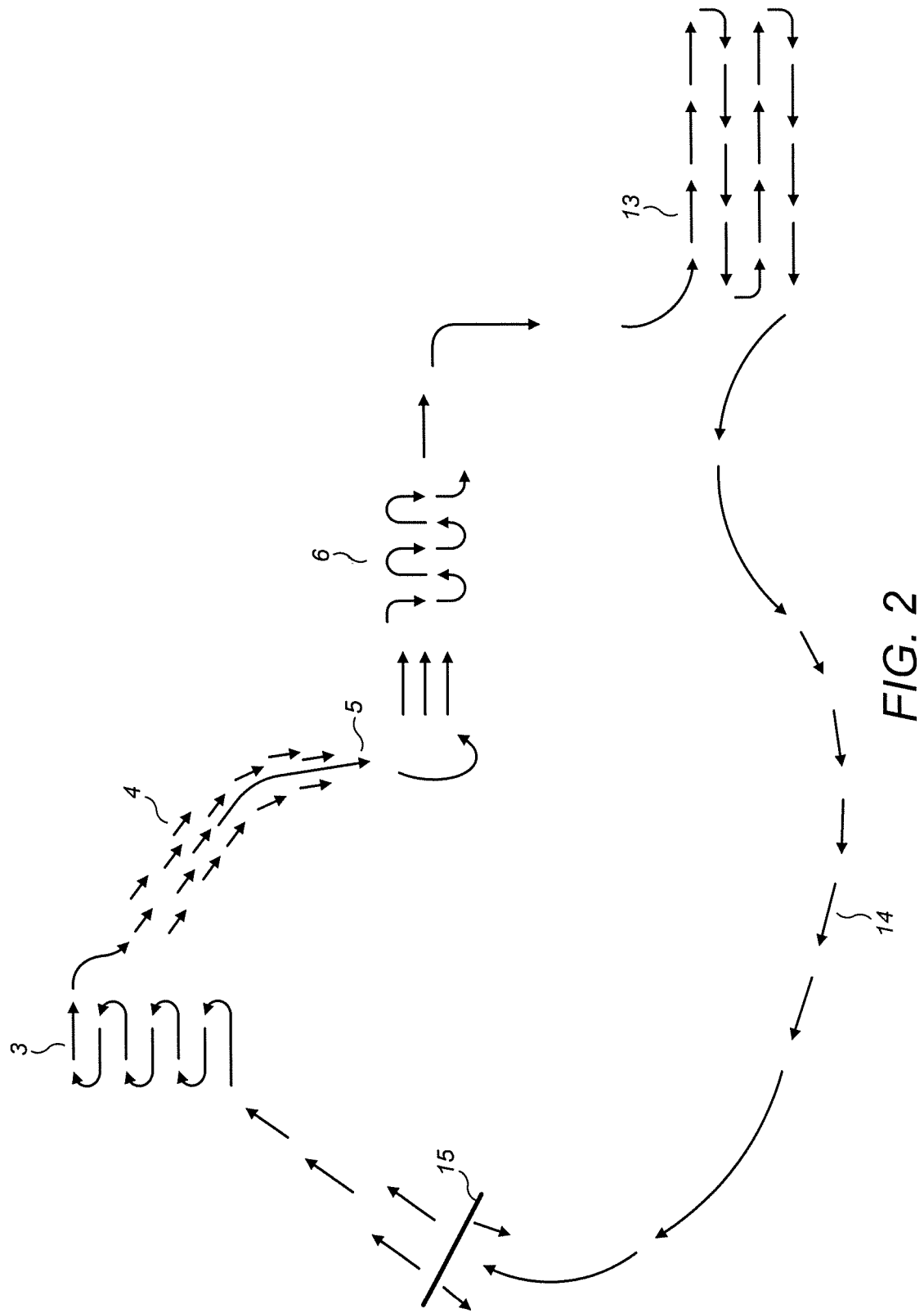
FIG. 2 is a schematic diagram showing the flow of circulating gas within the engine of FIG. 1.

FIG. 2 shows, in schematic form, the flow of gas through the engine 1, with the location of gas in the closed circuit within the relevant components, as outlined in FIG. 1 having the corresponding numbering. From this it can be seen that the loss of gas within the circuit is absolutely minimal, meaning that the gas can be cycled over a long period with minimal moving parts in the engine as a whole and extremely low environmental damage with no consumption of gas that is used within the circuit.

As will be appreciated from the above, by simple control of the compressor 3 and its output through the compressor outlet 4, the generator 10 can be powered to optimise the output of the engine 1 with high levels of efficiency and a minimal number of moving parts to reduce maintenance and improve operation. The configuration is such that the noise output of the engine is minimal when operating the engine, and that the engine can be controlled to have a wide variety of power outputs with minimal adaptation thereto through appropriate operation of the compressor 3, feedback of generated electricity to the compressor 3, and appropriate energy recovery from the exchanger 13 as well as appropriate control of the check valve 15.

The invention claimed is:

1. An engine comprising:
    a compressor and a closed fluid circuit to a compressor inlet and a compressor outlet such that a compressed working fluid can be driven through the circuit by the compressor, the compressor output being connected, through the fluid circuit, to a turbine component comprising at least one set of turbine blades connected to a rotating shaft that acts as the output of the engine in use, wherein no heater is disposed upstream of the turbine component;
    a condenser for receiving fluid in the circuit that has passed through the turbine component and arranged to reduce the temperature and pressure of the compressed working fluid, an outlet of the condenser being connected to the compressor inlet;
    a generator connected to the rotating shaft, wherein the generator generates electricity and at least a portion of the electricity generated by the generator is fedback to power the compressor to thereby control the power output of the engine; and
    at least one control component for controlling the feedback of electricity from the generator to the compressor.

2. The engine according to claim 1, further comprising a check valve positioned between the outlet of the condenser and the compressor input and configured to allow the compressed working fluid to flow only in the direction from the condenser to the compressor.

3. The engine according to claim 1, wherein the turbine component comprises plural sets of turbine blades, each attached to the rotating shaft.

4. The engine according to claim 1, wherein the compressed gas is one of carbon dioxide or ammonia.

5. The engine according to claim 1, further comprising energy recovery means associated with the condenser to recover a heat energy therefrom and provide an additional energy output from the engine.

6. The engine according to claim 3, wherein the number of sets of turbine blades, the number of turbine blades in each set, and an angle of configuration of the of the turbine blades is selected based at least in part on a pressure of the compressed working fluid in the turbine component.

7. The engine according to claim 3, wherein the number of sets of turbine blades, the number of turbine blades in each set, and an angle of configuration of the of the turbine blades is selected based at least in part on a flow rate of the compressed working fluid.

8. The engine according to claim 1, wherein the generator is mechanically connected to the compressor and is operable as a motor to start the compressor.

9. The engine according to claim 1, wherein at least a portion of the generator and the turbine component are intergrated into a single unit.

10. The engine according to claim 1, wherein the condenser is operable as a heat exchanger to recover heat energy.

11. The engine according to claim 1, further comprising a safety relief valve disposed in the fluid circuit to release pressure build-up.

12. The engine according to claim 1, wherein the compressed working fluid is not consumed within the fluid circuit.

13. The engine according to claim 2, wherein the check valve is operable to regulate a pressure differential across the compressor.

14. The engine according to claim 1, wherein the at least one control component receives electric power from the generator.

15. A system for generating energy comprising:
    a closed fluid circuit;
    a compressor for driving a compressed working fluid through the fluid circuit, the compressor comprising a compressor inlet connected to the fluid circuit and a compressor outlet connected to the fluid circuit;
    a turbine component connected through the fluid circuit, the turbine component comprising at least one set of turbine blades connected to a rotating shaft, wherein the compressor outlet is connected directly to the turbine component;
    a condenser for receiving the compressed working fluid in the fluid circuit that has passed through the turbine component and arranged to reduce a temperature and a pressure of the compressed working fluid, an outlet of the condenser being connected to the compressor inlet;
    a generator connected to the rotating shaft, wherein the generator generates electricity and at least a portion of the electricity generated by the generator is fed back to power the compressor to thereby control the power output of the system; and
    at least one control component for controlling the feedback of electricity from the generator to the compressor.

16. The system of claim 15, wherein the at least one control component receives electric power from the generator.

17. An engine comprising:
    a closed fluid circuit;

a compressor for driving a compressed working fluid through the fluid circuit, the compressor comprising a compressor inlet connected to the fluid circuit and a compressor outlet connected to the fluid circuit;

a turbine component connected through the fluid circuit, the turbine component comprising at least one set of turbine blades connected to a rotating shaft, wherein no heater is disposed between the compressor and the turbine component;

a condenser for receiving the working fluid in the fluid circuit that has passed through the turbine component and arranged to reduce a temperature and a pressure of the compressed working fluid, an outlet of the condenser being connected to the compressor inlet;

a generator connected to the rotating shaft, wherein the generator generates electricity and at least a portion of the electricity generated by the generator is fed back to power the compressor to thereby control the power output of the engine; and at least one control component for controlling the feedback of electricity from the generator to the compressor.

18. The engine of claim 17, wherein the at least one set of turbine blades comprises plural sets of turbine blades, each set being attached to the rotating shaft.

19. The engine of claim 18, wherein the number of sets of turbine blades, the number of turbine blades in each set, and an angle of configuration of the of the turbine blades is selected based at least in part on the pressure of the compressed working fluid in the turbine component.

20. The engine of claim 19, wherein the number of sets of turbine blades, the number of turbine blades in each set, and an angle of configuration of the of the turbine blades is selected based at least in part on a flow rate of the compressed working fluid.

* * * * *